1,591,398

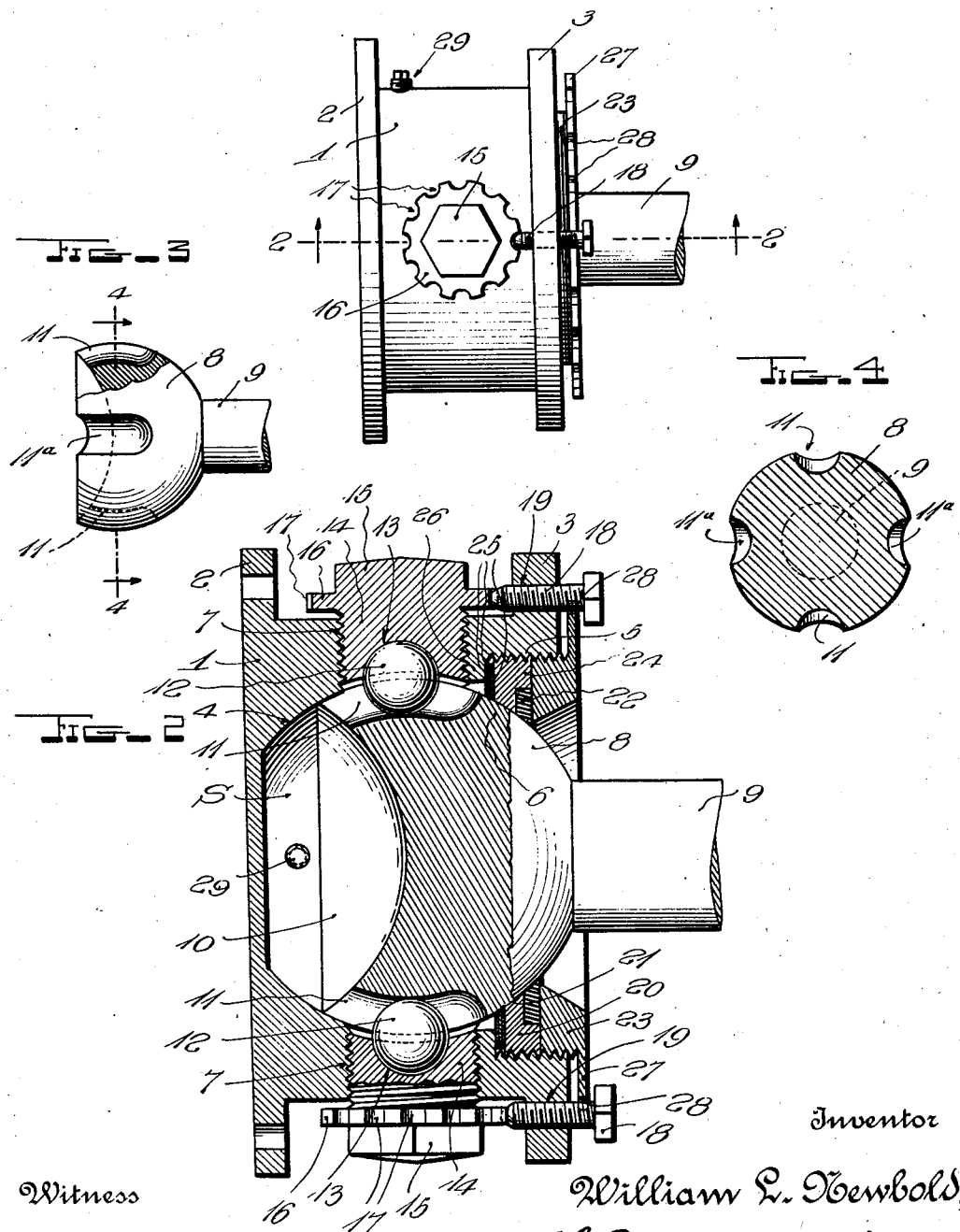
July 6, 1926.  
W. L. NEWBOLD  
UNIVERSAL JOINT  
Filed June 25, 1925  
1,591,398
Inventor  
William L. Newbold,  
By H. B. Willson & Co.  
Attorneys Patented July 6, 1926.

UNITED STATES PATENT OFFICE.

WILLIAM L. NEWBOLD, OF RUSHVILLE, INDIANA.

UNIVERSAL JOINT.

Application filed June 25, 1925. Serial No. 39,566.

My invention aims to provide a new and improved form of universal joint in which effective provision is made for lubrication, for taking up what little wear exists, for excluding grit and the like, and for locking adjusted parts against accidental movement, the construction being such that an exceptionally advantageous, efficient and long-lived joint is provided, which may be used in connection with any two angularly related shaft members or the like and will at all times establish an effective driving connection between them, free of such vibration as that which commonly exists with universal joints.

With the foregoing and minor objects in view, the invention resides in the novel subject matter hereinafter described and claimed, the description being supplemented by the accompanying drawing.

Figure 1 is a side elevation of a joint constructed in accordance with my invention.

Figure 2 is a longitudinal sectional view on line 2—2 of Fig. 1.

Figure 3 is a side elevation of the inner member or head of the joint, showing a slightly different form of construction than that disclosed in Fig. 2.

Figure 4 is a transverse sectional view as indicated by line 4—4 of Fig. 3.

In the drawing above briefly described, the numeral 1 designates a one-piece metal body preferably having flat ends provided with outwardly projecting flanges 2 and 3 respectively, the flange 2 being adapted for connecting said body to a coupling member on a shaft or the like, for instance, the crank shaft of an automobile motor. The flange 3 reinforces the opposite end of the body 1 and also performs another function to be hereinafter described. Formed centrally in the body 1 and opening through the end thereof which carries the flange 3, but not through the other end of said body, is a socket S, said socket having a substantially hemispherical inner end 4 and an enlarged outer end 5 whose wall is threaded, the intermediate portion 6 of the socket, from the hemispherical portion 4 to the enlarged portion 5, being of an internal diameter equal to the largest diameter of said hemispherical portion. For a purpose to appear, the body 1 is formed with at least two diametrically opposed and alined openings 7 whose walls are threaded, said openings leading from the exterior of said body to the interior thereof and having their common axis disposed in the transverse plane at which the hemispherical end 4 of the socket S, joins the intermediate portion 6 of said socket.

Received within the socket S, is a head 8 which may be carried by a shaft or the like 9. This head is of substantially spherical form, but the inner end thereof is cut away, is spaced inwardly from the inner extremity of the socket portion 4 and is formed with a preferably concave recess 10 from its center to its periphery. Thus, a considerable space is provided within the joint, to contain a lubricant, such as ordinary lubricating oil rather than comparatively heavy grease. Communicating with the recess 10 and formed in the periphery of the head 8 are two arcuate grooves 11 which, transversely, are substantially hemispherical as shown in Fig. 4 and also illustrated by the shading in Fig. 2. Lengthwise, these grooves are arcuate and are disposed on lines in a plane common to the axis of the head 8 and shaft 9, the inner walls of said grooves being concentric with the periphery of the head as shown.

A pair of metal balls 12 are disposed partly within the grooves 11 and the outer portions of said balls are received in hemispherical sockets 13 formed in the inner ends of plugs 14 which are threaded adjustably in the openings 7, the outer ends of said plugs being preferably shaped as at 15 for engagement by a wrench so that they may be inwardly adjusted to take up wear and may be readily manipulated when assembling the bearing or when making repairs. These plugs are also provided, in the present showing, with outstanding annular flanges 16 having circumferentially spaced notches 17, said notches being co-operable with the inner ends of set screws 18, the latter being threaded through openings 19 in the flange 3, whereby the plugs may be locked in adjusted position.

Threaded adjustably into the enlarged end 5 of the socket S, is a head-retaining ring 20 whose inner edge 21 is transversely curved and snugly engages the periphery of the head 8, to retain the latter in the socket S. Contacting with the outer side of this retaining ring and of less diameter than the same, is a flexible packing washer 22 which engages the periphery of the head to prevent oil from leaking out and to exclude foreign matter. Contacting with the outer side of the packing ring 22, is an internally flared locking ring 23 which is threaded into the socket end 5, and suitable thrust means 24 surrounds the packing ring 22 to transmit thrust from the ring 23 to the ring 20, and vice versa, said means 24 being preferably a rib integral with the ring 20, as shown.

In the preferred form of construction, a plurality of thin washers 25 are interposed between the ring 20 and a shoulder 26 which is formed at the juncture of the socket portions 5 and 6, when the joint is assembled, said ring 20 contacts with these washers and the latter in turn contact with said shoulder. When it is necessary to inwardly adjust the ring 20 to compensate for wear, said ring and the rings 22 and 23 may be removed and one or more of the washers 25 withdrawn, so that when the parts 21, 22 and 23 are reinserted, snug contact will be established between the edge 21 of the ring 20 and the periphery of the head 8.

To effectively lock the ring 23 in adusted position, I have provided it with an outstanding annular flange 27 having notches 28 for alinement with the openings 19 of the flange 3, the alined notches being adapted to engage the set screws 18, as shown in Figs. 1 and 2, so that these screws perform the double function of locking the ring 23 against accidental movement and similarly locking the plugs 14. To make an adjustment of the plugs, it is simply necessary to loosen the screws 18 until they disengage from the notches 17, but before the ring 23 can be removed or adjusted, it is necessary to entirely remove the screws.

If desired, although only two of the curved grooves of the head 8 are intended to function at one time, said head may be provided not only with the grooves 11 but with any desired number of additional, similar grooves, such as those disclosed at 11a in Figs. 3 and 4. It will also be understood that if desired, plugs 14 and openings 7 could be provided in the body 1 opposite the grooves 11a, but these added plugs and grooves could normally be idle and brought into use only in case of excessive wear or injury to the corresponding parts which normally function. Under such circumstances, the added plugs could be removed and balls such as 12 inserted into the additional grooves 11a, as will be readily understood, or when the grooves 11a are used even without the additional plugs, the head 8 may be turned to aline these grooves with the openings 7 after removing the plugs 14 and balls 12. Then, when new balls are placed in these grooves and either the old plugs 14 or new plugs inserted, the joint will be practically as good as new, it being of course understood that no such change as this will be required until the walls of the grooves 11 have become excessively worn, and even with long hard use, the wear will be very slight, due to the effective lubrication afforded by the construction shown. The space between the concave end 10 of the head 8 and the adjacent end of the socket S may be filled with oil either by removing one of the plugs 14 or a special plug 29 shown in Fig. 1, and as the grooves of said head all open into the recess 10, they can directly and freely receive oil therefrom. Moreover, by centrifugal force, this oil is thrown toward the periphery of the device, effecting thorough lubrication of the balls 12 and the surfaces which contact therewith, as well as all other contacting surfaces of the joint.

The construction shown is exceptionally rigid and durable and on account of effective lubrication, the wear in a great length of time is practically infinitesimal, but by adjusting the plugs 14 and the rings 21, 22 and 23, this wear may be effectively taken up, and if the head 8 be provided with additional grooves 11a to be brought into play in place of the previously used grooves 11, the effective life of the joint will be still further lengthened. The construction is such that it permits all necessary movement between the body 1 and the head, even though the shaft or the like 9 may be disposed at quite an angle or at a constantly varying angle to the body. Moreover, in all relative positions of the body and head, the driving connection between them afforded by the balls 12, plugs 14 and grooves 11 or 11a, is constant and due to this, as well as other details of construction, the joint will be free of vibration and will consequently be greatly advantageous over some types of universal joints heretofore devised.

As excellent results may be obtained from the details disclosed, they are preferably followed. However, within the scope of the invention as claimed, modifications may be made and it will be understood that any desired materials, tempered where necessary, may be used in the construction of the device.

I claim:

1. A universal joint comprising a one-piece body having an axial socket whose inner end is substantially hemispherical and whose outer end is enlarged thereby forming at the inner end of said enlargement an annular shoulder, said body having at least two diametrically opposite threaded openings extending from its exterior to its interior, a shaft-carried substantially hemispherical head in said socket, said head having arcuate grooves disposed at the inner ends of the openings in said body, bearing balls arranged in said grooves, adjustable plugs threaded into said openings, said plugs having sockets in their inner ends to receive the outer portions of said balls, an adjustable head retaining ring threaded into said enlarged end of said socket, a plurality of thin washers arranged between the inner side of said retaining ring and said annular shoulder, one or more of said washers being adapted to be removed to permit the inward adjustment of said retaining ring, a flexible packing ring contacting with the outer side of said retaining ring and with said head and a locking ring threaded into said enlarged end of the socket and contacting with the outer sides of said packing and retaining rings.

2. A universal joint comprising a one-piece body having an axial socket whose inner end is substantially hemispherical and whose outer end is enlarged and internally threaded, said body having at least two diametrically opposite threaded openings extending from its exterior to its interior, a shaft carried substantially hemispherical head in said socket, said head having arcuate grooves disposed at the inner ends of the openings in said body, bearing balls arranged in said grooves, adjustable plugs threaded into said openings, said plugs having sockets in their inner ends to receive the outer portions of said balls, an adjustable head retaining ring threaded into said enlarged end of said socket, a flexible packing ring threaded into said enlarged end of the retaining ring and with said head, a locking ring threaded into said enlarger end of the socket and contacting with the outer sides of said packing and retaining rings, and common means for simultaneously locking both said locking ring and said plugs against accidental movement.

3. A universal joint comprising a one-piece body having an axial socket whose inner end is substantially hemispherical and whose outer end is enlarged, the intermediate portion of the socket from the enlargement to the hemispherical end being of a diameter equal to the largest diameter of said hemispherical end, a shaft-carried substantially hemispherical head in said socket and operatively connected with said body, a head-retaining ring threaded adjustably into said enlarged end of the aforesaid socket and having its inner edge transversely curved and in contact with the outer end of the head, a flexible packing ring contacting with the outer side of said retaining ring and of less external diameter than the latter, the inner edge of said packing ring contacting with the head, a locking ring threaded into said enlarged socket end and contacting with the outer side of said packing ring, thrust means surrounding said packing ring for transmitting thrust from the locking ring to the retaining ring independently of said packing ring, and locking means for said locking ring.

4. A universal joint comprising a body having a socket which opens through one of its ends, a shaft-carried head in the socket, means for retaining the head in the socket including a ring threaded adjustably in the outer end of said socket, said ring having a projecting flange at said one end of the body provided with circumferentially spaced notches, bearing means establishing operative driving connection between the head and body and including plugs disposed radially of and threaded adjustably in the body, the outer ends of said plugs having circumferentially spaced notches, said body having a projecting portion between the aforesaid flanges and the plugs, said portion being formed with openings with which the notches of said flange and plugs may be alined, and set screws threaded through said openings of said projecting portion and engaging certain notches of the flange and plugs to lock the latter and the aforesaid ring against accidental movement.

In testimony whereof I have hereunto affixed my signature.

WILLIAM L. NEWBOLD.